United States Patent [19]

Lowrie

[11] 4,073,734
[45] Feb. 14, 1978

[54] MARINE SEPARATOR

[75] Inventor: Neely E. Lowrie, Tulsa, Okla.

[73] Assignee: Combustion Engineering, Inc., Windsor, Conn.

[21] Appl. No.: 717,793

[22] Filed: Aug. 25, 1976

[51] Int. Cl.² .............................................. B01D 21/10
[52] U.S. Cl. .................................. 210/532 R; 55/174; 210/540
[58] Field of Search ................. 210/83, 242, 513, 518, 210/522, 532, 537, 538, 539, 540; 55/175, 176, 174

[56] References Cited

U.S. PATENT DOCUMENTS

| 1,864,511 | 6/1932 | Jones | 210/537 X |
| 2,783,854 | 3/1957 | Lovelady et al. | 55/175 X |
| 2,825,422 | 3/1958 | Schoenfeld | 55/175 X |
| 2,868,312 | 1/1959 | Erwin | 55/175 X |
| 2,868,313 | 1/1959 | Leuszler et al. | 55/175 X |
| 3,884,815 | 5/1975 | Cornelissen | 210/532 |

Primary Examiner—Theodore A. Granger
Attorney, Agent, or Firm—Arthur L. Wade

[57] ABSTRACT

A single, horizontally extended cylinder receives in one end a mixture of produced fluids from an oil well. Baffles within the shell control the liquids of the production during pitch and roll to prevent agitation of the separating liquids.

4 Claims, 7 Drawing Figures

MARINE SEPARATOR

BACKGROUND OF THE INVENTION

1. Field of the Invention

This invention relates to liquid separation units mounted on marine installations. More specifically, the invention relates to mechanical containment, or restraining movement, of separating oil field fluids to minimize disruption of the separation process during pitch and roll of the separation unit.

2. Description of the Prior Art

Separation of a plurality of liquids is provided by residence capacity in which gravity forces collection of the different liquids into separate bodies. Additionally, variables such as pressure, temperature, viscosity and tubulence have various effects upon the separation process.

The residence capacity is provided by the volumes of spherical, vertical or horizontal vessels. The general preference, in oil field separation, is the horizontal vessel. These generally cylindrical, horizontally extended, vessels receive oil field production in one end, and pass its fluids into contact with baffles, partitions and other structures within the vessel. Finally, the fluids are separated, formed into separate bodies, and passed from separate outlets of the vessel, remotely located from the inlet.

There are at least two classes of horizontal separator vessels. There is the simple, single, horizontal, cylinder and the double-barreled arrangement wherein two horizontal cylinders are connected by vertical conduits.

Obviously, the double-barreled separator is an efficient production tool. The mixture of fluids are flowed into the upper cylinder. As the liquids separate from the gaseous fluids they flow down the vertical conduits into the isolation provided by the lower cylinder. If the expense of fabrication and the space for installation does not become a limitation, the double-barrel separator is preferred to the simple, single, horizontal cylinder.

Shipboard separation vessels are now required by the production segment of the oil business. Marine installations now bring in the problem of pitch and roll. The liquids accumulated in the horizontally elongated separation vessels are agitated by pitch and roll. It does not take a high order of imagination to understand that the process of separating oil and water will be disrupted as wave action causes the separating liquids to displace in their separation vessel. Level controls will be disturbed and failure of the process will be evidenced by oil flowing out the water outlet and/or water flowing out the oil outlet.

The double-barrel form of separator would give some insurance of effective control of the separating liquids on a marine installation. However, where the single-barreled, monotube, form of separator must be used because of space or economical reasons, a severe problem exists. Some form of compartmenting is required to restrain, or contain, the movement of separated water in the lower volume of the separator vessel. A unique form for baffle plates must be employed in a configuration which will provide the required compartment to keep the liquids under control so their separation can take place.

SUMMARY OF THE INVENTION

It is a principle object of the invention to restrain, or contain, the body of separated heavier liquid in the lower volume of a horizontal separator vessel to maintain a stable interface between the body of heavier liquid and the upper body of a separated lighter liquid.

Another object is to provide the liquid-liquid interface in a liquid packed compartment of a horizontal separator vessel to minimize the velocity and volume of movement of the liquids and maximize the effectiveness of their gravity separation.

Another object is to provide control of the flow of separating heavier liquid from the upper volume of the separator into the body of collected heavier liquid in the lower volume.

Another object is to provide a controlled return flow for lighter liquid that is carried to the lower separator volume with the heavier liquid back to the upper separator volume.

Another object is to provide level control means for the separate liquid outlets which will function during pitch and roll of the marine installation of the separator.

The present invention contemplates a horizontally extended cylindrical sheel receiving a mixture of liquids in one end and separate outlets for the liquids at the other end of the shell. A horizontal plate is mounted to extend from the inlet end of the shell for a substantial length of the shell to divide the shell into upper and lower volumes. An opening is provided in the flat plate between its ends and baffles depend from this opening to form a well down which the heavier liquid is expected to flow in the separation process. The heavier liquid, and any lighter liquid swept along with the heavier liquid, flows from beneath the plates of the well and into the body of heavier liquid collected beneath the horizontal plate. Conduits extend up through the horizontal plate on each side of the central well to provide a flow path for lighter liquid back to the upper volume of the shell above the horizontal plate.

The invention also contemplates the well-forming baffles being adjustable on their lower ends to fix the size of the flow path for heavier liquid into the body of separated heavier liquid and the size of the flow path for heavier liquid in the body collected beneath the horizontal plate.

The invention also contemplates the conduits up through the plate and on each side of the well opening having adjustable openings to regulate the rate at which lighter liquid returns up through the conduits to above the plate.

The invention more specifically contemplates the horizontally extended cylindrical shell receiving oil well production in which the lighter and heavier liquids separated are oil and water.

Other objects, advantages, and features of the invention will become apparent to one skilled in the art upon consideration of the written specifications, appended claims, and attached drawings.

DRAWING DESCRIPTION

DESCRIPTION OF THE PREFERRED EMBODIMENT

STRUCTURAL GENERALIZATION

Figure 1:
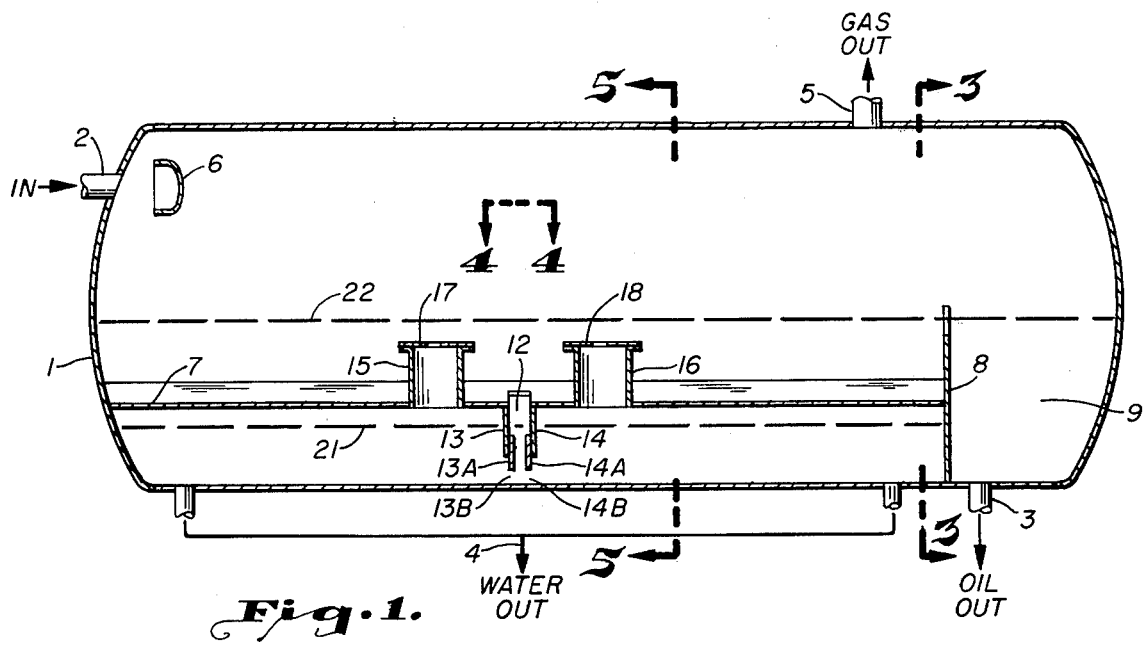
FIG. 1 is a sectioned elevation of a separator for fluids embodying the invention.

FIG. 1 discloses the shell 1 in the general form of a horizontally extended cylinder. Within this shell are mounted the structures which enable 3-phase oil well production to separate while the shell is mounted on a marine platform.

The production is flowed into the shell through inlet conduit 2. This inlet is shown in the left end of shell 1 as viewed in FIG. 1. Oil outlet 3, water outlet 4, and gas outlet 5 are located downstream of the inlet. Between the inlet and the remote outlets, separation of the fluids is carried out in the residence time provided by the shell and the structure within the shell.

As in prior art horizontal separator shells, the three phases of the well stream flowed into the shell begin to separate as the stream enters the shell. The diverter structure 6 may take various forms. However formed, structure 6 absorbs the momentum of the incoming production stream to further the breakout of the gaseous phase of the well stream. This gaseous phase flows directly to outlet 5. The liquids fall to horizontal plate 7 which extends from the left head of shell 1 a substantial length of the shell.

This plate 7 is an essential element of the invention. It is placed at an elevation above both the bottom of the shell and near the interface between oil and water in the lower volume of the shell. The compartment formed in the lower part of the shell is to be noted as liquid packed as the shell is pitched and rolled. With proper conduits for the liquids to flow the water to below the plate and to flow the oil to above the plate, the plate becomes the calm hand on the separating liquids overcoming marine forces which would agitate the liquids and disrupt the separating process.

Plate 7 extends from the shell head to the left to baffle plate 8. Plate 7 could extend the full length, between shell heads. However, in FIG. 1 baffle plate 8 is extended vertically as it is sealed to the bottom and sides of the shell, and the downstream end of plate 7 is connected to, and supported by, this baffle plate 8. Plate 8 extends above its attachment to plate 7, its upper edge forming a weir over which oil on the upper side of plate 7 is expected to flow into the remote, right end of shell 1.

Compartment 9 is formed in the end of shell 1, between vertical, transverse plate 8 and the head of shell 1 which is remote from the inlet 2. The oil, flowing over the upper edge of plate 8, collects in compartment 9 and is withdrawn through outlet 3 as valved under the control of a level-sensing primary element in a stilling well.

This structure of a "bucket" compartment 9 within a horizontal separator is old hat to one skilled in this art. Oil is caught in the bucket and valved out of the bucket with a control system which is responsive to level. This invention is embodied in that structure which furthers separating oil from the water, keeping the fluids separated as the shell is pitched and rolled and valving the liquids separately to discharge while the shell is being moved by marine forces. Gas control does not have as severe a problem because the pitch and roll has relatively little effect on the flow of gas through the separator.

Keeping to structural generalizations at this point, plate 7 is provided with a well opening 12 through the plate between ends. Baffles 13, 14 transverse the longitudinal axis of the shell, form vertical, downward extensions on the lower end of well opening 12 and have adjustable extensions 13A, 14A with which to form openings 13B, 14B.

Conduits 15, 16 are mounted to extend through plate 7 on each side of well opening 12. Perforated covers 17, 18 on the upper ends of these conduits represent means to control the flow of liquids passed from below plate 7 to above plate 7.

FUNCTIONAL GENERALIZATION

The disclosure has contemplated the function of flowing oil well production into the left end of shell 1 through inlet conduit 2. The gas will separate and flow to its outlet 5.

The liquids, oil and water, will fall to plate 7, and flow along the plate, toward baffle plate 8. At well opening 12, the heavier liquid, water, is expected to descend between depending, transverse baffles 13, 14 and divide between openings 13B, 14B in distribution through the lower volume of shell 1 beneath plate 7.

Of course, there is a degree of turbulence in the liquids, even as they separate. Some oil will be swept along with the water into the lower volume. The separation will continue, the interface between the liquids forming near plate 7. In FIG. 1 the interface is shown just below plate 7. The discharge of water through outlet 4 is regulated to maintain the interface below the plate 7. Excess oil is expected to flow up through conduits 15, 16, and oil above plate 7 will flow over the upper edge of baffle plate 8 to form the collection in compartment 9 for controlled discharge through outlet 3.

In the absence of pitch and roll, the separation of the gas, oil and water of the production will occur around and under the internal structure in general as it would if the structure were not present. When the vessel is pitched and rolled the plate 7, and its attendant structure, restrains, contains and guides the liquids to give sufficient stability to the process for uninterrupted separation of the liquids.

MEASUREMENT AND CONTROL

While the fluid flows are guided, restrained and separated the liquids collected after separation are discharged from the shell under control. The levels of the collections are sensed and the liquids discharged from the collections to keep the levels within predetermined ranges.

Figure 2:
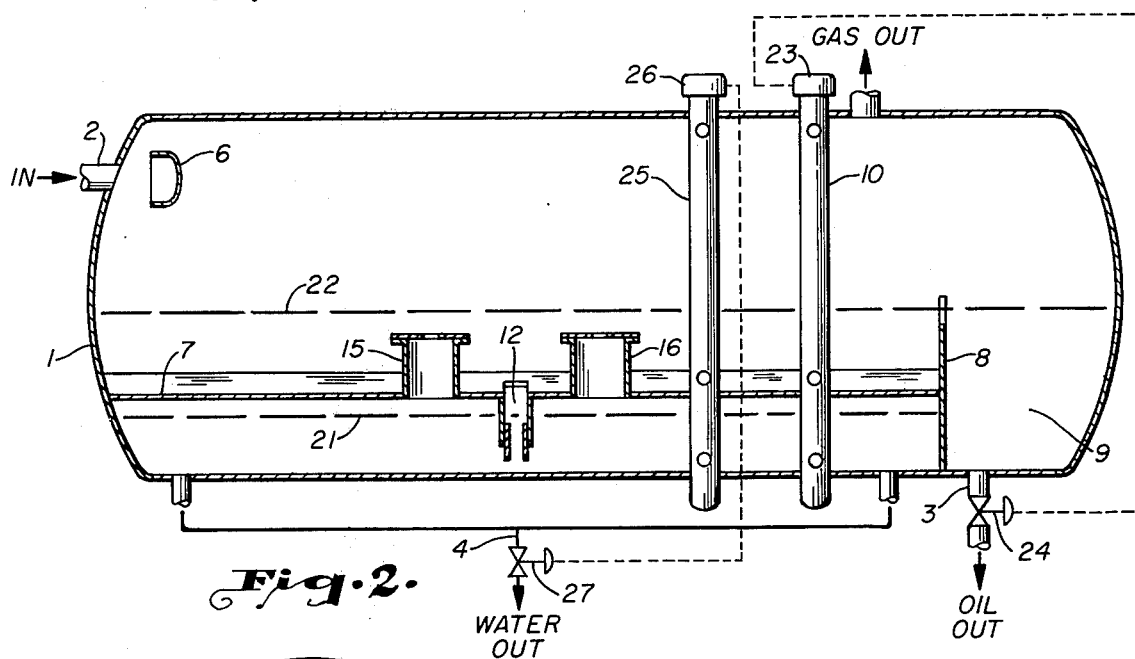
FIG. 2 is an elevation of the separator of FIG. 1 with liquid level stilling wells connected to the fluids within the separator.

FIG. 2 is established to disclose means for sensing the levels of the interface 21 and the oil level 22. The primary element in this disclosure, for level sensing, is a float. In each sensing structure, the float is provided a stilling well connected to receive liquids whose levels are sensed.

A stilling well and float for liquid level detection are not new. However, in the present disclosure, the wells used are placed where the marine movement of the shell will have a minimum effect on the levels sensed by the floats in the wells. Specifically, the wells are inserted down through shell 1, transverse its longitudinal axis. Pitch and roll of the shell will then result in only minor variations between the liquid levels in the shell and the liquid levels in the wells.

There are two, basic, continuous detections of liquid levels to be made in this embodiment of the invention.

The interface 21 is sensed and used to control discharge of separated water through conduit 4. The oil level 22 is sensed and used to control discharge of separated oil from conduit 3.

The actual reduction to practice contemplates a detection of the oil level in compartment 9 which will override the normal control of conduit 3. If the oil level becomes so low in compartment 9 that there is danger of gas going out with the oil, an extra stilling well and float will be installed in shell 1 to stop discharge of oil through conduit 3 when the predetermined, dangerously low level in compartment 9 is reached. However, it appears that a specific disclosure of this contemplated low-level control would needlessly complicate the drawings.

Similar reasoning applies to the decision to leave out a stilling well and float to sense a predetermined high level of oil. Level 22 could become so high that the flow of fluids, and their separation, would not take place as desired. At this time in the operation, it will be desired to control the entry of fluids into the shell and/or increase the discharge of fluids from the shell in excess of the normal flow rate. The stilling well and float for this high-level control is also not shown in FIG. 2.

Although the concept of using a stilling well and float for level detection is not new, placing the wells where they will not be adversely affected by pitch and roll was a problem. The wells could have been placed external the shell, but the pitch and roll effect could then cause erratic relationships between well levels and shell levels. Therefore, the wells are installed within the shell and connected to the fluids within the shell by the openings disclosed in the walls of the wells.

The marine movements of the stilling wells and their floats have a rather specific problem. If the float and well diameters are not sized properly, the float will "hang-up" on the wall of the well during pitch and roll. Float-to-wall contact had to be avoided by careful sizing.

In FIG. 2, oil level stilling well 10 is disclosed with an instrument 23 mounted on its top. The hang-down float within the well actuates 23 to develop a control signal which is applied to oil valve 24 in conduit 3.

Stilling well 25 is disclosed as having an instrument 26 to develop a control signal for valve 27. Well 25 is connected to both the oil and water collections so the float will detect the interface between oil and water and control the discharge of water to keep the interface within a predetermined vertical range.

Figure 3:
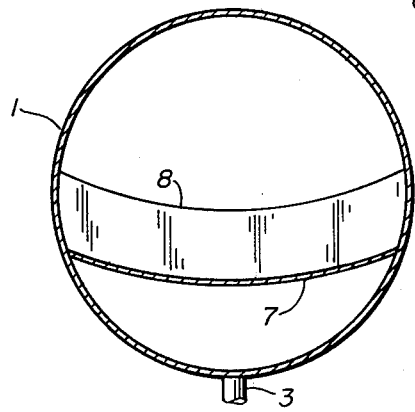
FIG. 3 is a section of FIG. 1 along lines 3—3.

FIG. 3 is established to disclose plate 7 and the upper edge of baffle 8 as curved between its connections to the sides of shell 1. This curve in plate 7 is indicated in FIGS. 1 and 2 but is shown to better advantage in FIGS. 3 and 4.

Curving plate 7, as disclosed, relieves the stress between the plate and the sides of shell 1 as the shell 1 dimensions change in its temperature cycles. It is better for plate 7 to bow in a predetermined direction than buckle in unpredictable directions and generate erratic stress between plate and shell.

Additionally, bowing plate 7 downward positively guides the separating water of the fluids to well 12. Paralleling the bow of plate 7 with the upper edge of baffle 8 negates water, which does temporarily collect on the top of plate 7, from slopping over the edge during roll of the marine installation.

Figure 4:
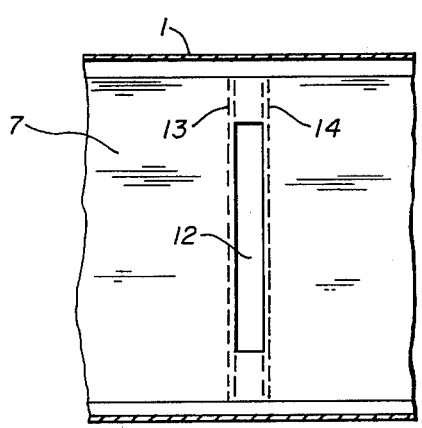
FIG. 4 is a section of FIG. 1 along lines 4—4.
Figure 5:
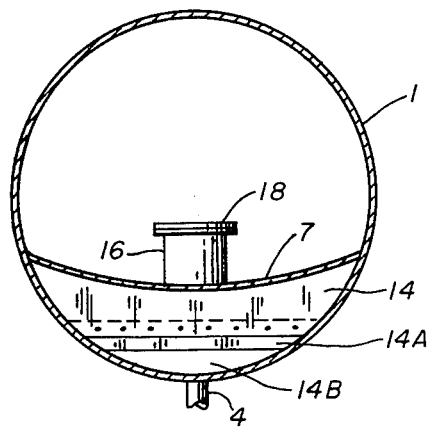
FIG. 5 is a section of FIG. 1 along lines 5—5.

A good disclosure of well 12 is provided with FIG. 4. It will be recalled that the separating water is expected to flow down well 12 and flow out openings 13B and 14B to settle in the bottom of shell 1. The cross-sectional area of this well 12 and openings 13B and 14A is fixed to freely flow the water to the collection in the bottom of shell 1. However, enough restriction is provided to control the travel of the liquids longitudinally of the shell during its pitching. To provide for adjustment of the restriction offered by openings 13B and 14B, plates 13A and 14A are adjustably attached to the depending plates 13 and 14. The openings 13B and 14B are adjustable by positioning plates 13A and 14A vertically to set the size of openings 13B and 14B.

Figure 6:
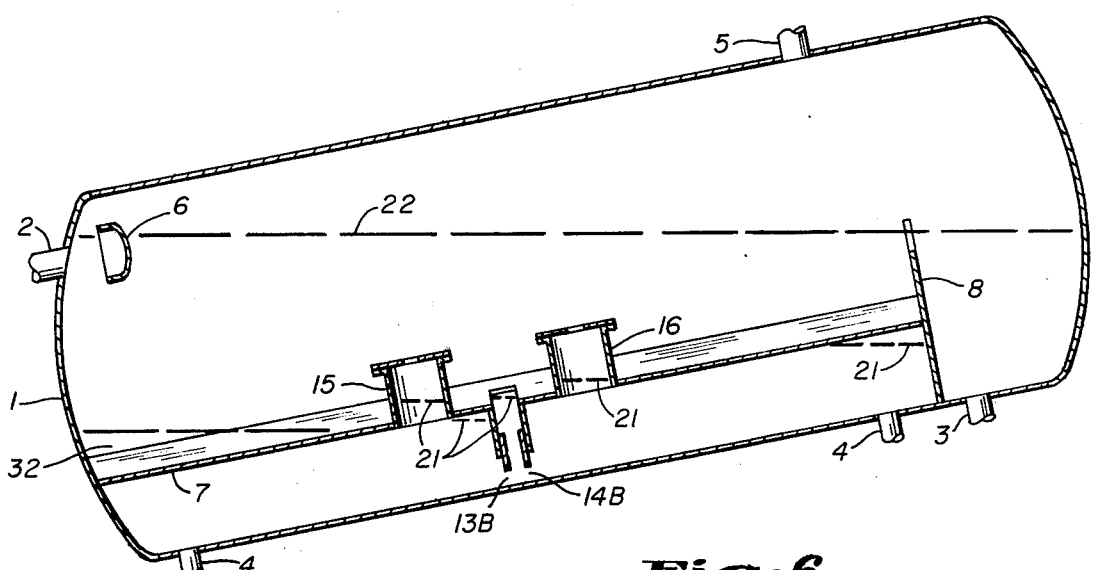
FIG. 6 is a somewhat diagrammatic elevation of the separator of FIG. 1 as pitched to one extreme.
Figure 7:
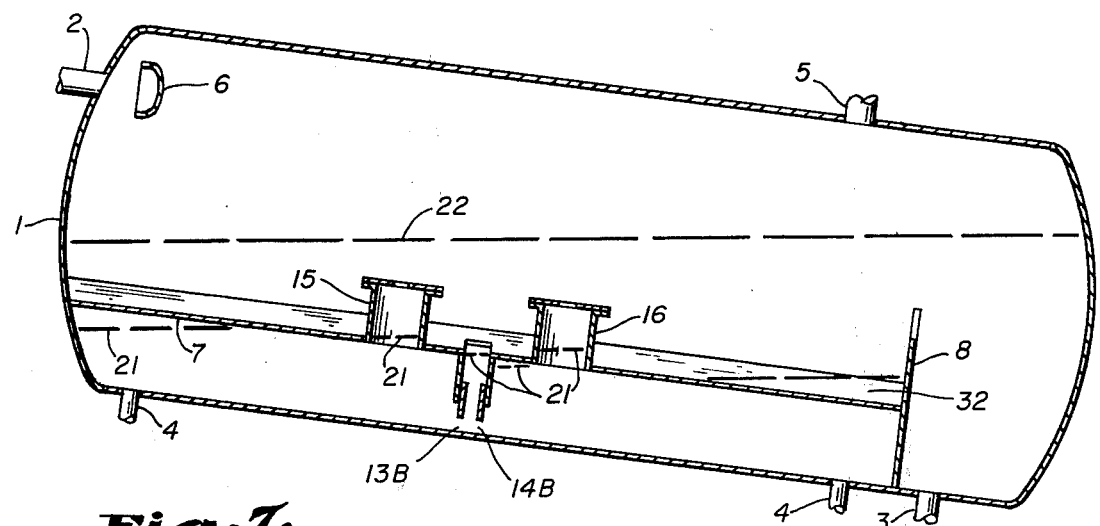
FIG. 7 is similar to FIG. 6, the separator as pitched to the other extreme.

In translating from the liquid positions of FIGS. 1 and 2 to the positions disclosed in FIGS. 6 and 7, openings 13B, 14B, conduit 15 and conduit 16 control the flow of liquids along the length of shell 1. FIG. 6 shows the shell 1 in one extreme of pitch. FIG. 7 shows the other extreme of pitch. The water below interface 21 flows through the passageway provided with openings 13B, 14B offering enough restriction to dampen any expected wave force on the liquids which would disrupt separation.

There will be, in all probability, some water trapped above plate 7. The location of the body of water during pitching is indicated at 32. The top edge of baffle 8 is placed at the elevation which will contain this water body 32 in the pitch position of FIG. 7 Baffle 8, therefore, isolates this water from oil outlet 3.

FIGS. 6 and 7 are established to provide some analysis of the dynamics of the structure embodying the invention in relation to the separating fluids. The larger forces generated on the fluids are developed by pitching. Therefore, FIGS. 6 and 7 set the scope of the analysis by disclosing the shell of the separator at each extreme of pitch.

The precise degree of pitch in subjective installations is not to be taken s that disclosed by FIGS. 6 and 7. FIGS. 6 and 7 are only established to indicate how plate 7 functions under the inventive concepts. In the drawings, plate 7 is extended a substantial length of the shell 1. Vertically, plate 7 is close to the interface. With baffle plate 8, plate 7 and the lower portion of shell 1 form a liquid packed compartment. Pitching of this elongated compartment will cause relatively little turbulence in in the separating oil and water interfacing in the compartment. The containment and restraint by plate 7 controls the liquids in the compartment so they will not be displaced and will continue to separate in an orderly fashion.

Plate 7 is basically a restraining structure for the separating liquids. The oil and water brought into shell 1 above the plate 7 flow into well 12. The heavier water flows down well 12, between baffles 13 and 14. Therefore, the water, and some oil, is flowed well below the interface 21 to join the body, or collection, of water below interface 21.

The oil, swept along with the water, flows upward to join the body, or collection, of oil above interface 21. Any excess oil flows upward and through conduits 15 and 16. Thus, there is a continual flowing of liquid down well 12 and up conduits 15 and 16 to maintain interface 21 in position a short distance from plate 7.

As the shell 1 is pitched between the extreme positions disclosed in FIGS. 6 and 7, there is displacement of interface 21 and the liquids above and below the interface. It is at this time the baffles 13 and 14 and conduits 15 and 16 come into play. In each of FIGS. 6 and 7, interface 21 is shifted to the positions shown, the lengths of conduits 15 and 16 and baffles 13 and 14 preventing flow from the body of water back to above plate 7. The interface 21 is broken into segments as indicated in both FIGS.

Above plate 7 there is some collection of water which has not flowed down well 12. This water is considered trapped above plate 7 during the extreme pitch position of FIGS. 6 and 7. This collection 32 is prevented from flowing into oil compartment 9 by baffle plate 8 as can be seen in FIG. 7.

As the liquids are shifted beneath plate 7, their flow rate is controlled by the size of openings 13B and 14B. The rate of this flow will be set by adjusting the size of openings 13B and 14B by vertical positioning of extensions 13A and 14A. Another adjustment of flow rate is in setting the size of openings in covers 17 and 18 of conduits 15 and 16. All of these adjustments will be made according to the specific conditions of each marine installation. But in all events, the invention provides for the basic control of the fluids within pitched shell 1 to protect the separating process.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A separator structure for the fluids of oil well production adapted to be mounted in a marine environment, including, a marine platform located where it will be subject to wave action which will pitch and roll the marine structure, a shell in the form of a horizontally extended cylinder and mounted on the marine platform to pitch and roll with the marine platform, a source of oil well production at the location of the marine platform, an inlet through one end of the shell and connected to the source to direct production from the source into the shell, a plate member mounted within the shell to extend horizontally and parallel the longitudinal axis of the shell from the inlet end of the shell and beneath the inlet to divide a substantial length of the shell into upper and lower volumes, a vertical baffle plate sealed to the bottom and sides of the shell and extending its upper edge as a weir above the horizontal plate member to which it is sealejd to form a compartment below the horizontal plate for the lower volume, an opening through the horizontal plate member at substantially its midpoint, baffles depending vertically downward from the plate opening, a conduit with open ends on each side of the midpoint opening and extending upward, a first outlet through the shell wall and from the compartment below the plate member, and a second outlet through the lower portion of the shell wall and beyond the vertical baffle plate, whereby, as the shell is pitched, the plate member receives all of the mixed liquids of the production on its upper surface, the heavier of the liquids flowing through the midpoint opening of the plate member and the interface between the liquids which is formed beneath the plate member while lighter liquids carried beneath the plate member return up through the conduits on each side of the opening and over the weir of the vertical baffle plate to the second outlet while the heavier liquids flow to the first outlet to complete the separation during pitching of the shell.

2. The separator structure of claim 1, in which,
the baffles depending vertically downward from the plate opening form a well with the sides of the shell terminating a predetermined distance above the shell bottom in forming horizontal passageways for liquids beneath the interface of the liquids collected beneath the plate member.

3. The separator structure of claim 2, in which, the conduits on each side of the midpoint opening are adjustable in their size.

4. The separator structure of claim 3, in which, the plate member mounted within the shell is bowed downward in cross-section as it extends from its seal to the shell sides.

* * * * *